(12) United States Patent
Doerband (10) Patent No.: US 8,243,281 B2
(45) Date of Patent: Aug. 14, 2012

(54) METHOD AND SYSTEM FOR MEASURING A SURFACE OF AN OBJECT

(75) Inventor: Bernd Doerband, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 276 days.

(21) Appl. No.: 12/238,193

(22) Filed: Sep. 25, 2008

(65) Prior Publication Data
US 2009/0079992 A1   Mar. 26, 2009

Related U.S. Application Data

(60) Provisional application No. 60/975,000, filed on Sep. 25, 2007.

(51) Int. Cl.
*G01B 11/02* (2006.01)
(52) U.S. Cl. ......................... 356/511; 356/521
(58) Field of Classification Search .................. 356/497, 356/511, 496, 499, 512, 521
See application file for complete search history.

(56) References Cited

U.S. PATENT DOCUMENTS

| | | | |
|---|---|---|---|
| 5,321,501 A | 6/1994 | Swanson et al. | |
| 5,426,862 A | 6/1995 | Ham et al. | |
| 5,489,984 A | 2/1996 | Hariharan et al. | |
| 5,526,116 A * | 6/1996 | de Groot | 356/512 |
| 5,559,601 A | 9/1996 | Gallatin et al. | |
| 5,784,163 A | 7/1998 | Lu et al. | |
| 6,790,175 B1 | 9/2004 | Furusawa et al. | |
| 6,912,055 B2 * | 6/2005 | Ueki et al. | 356/511 |
| 7,443,514 B2 * | 10/2008 | Harned et al. | 356/512 |
| 7,492,468 B2 * | 2/2009 | Henselmans et al. | 356/511 |
| 2006/0114473 A1 | 6/2006 | Tearney et al. | |
| 2006/0227335 A1 * | 10/2006 | Takeshita et al. | 356/521 |
| 2006/0268282 A1 * | 11/2006 | Evans et al. | 356/515 |

FOREIGN PATENT DOCUMENTS

| | | |
|---|---|---|
| DE | 2163040 | 9/1972 |
| DE | 44 14 551 A1 | 1/1995 |
| DE | 195 12 445 A1 | 10/1995 |
| DE | 100 53 447 A1 | 7/2001 |
| DE | 69530757 T2 | 3/2004 |
| EP | 0108497 A1 | 5/1984 |
| EP | 0 104 322 B1 | 1/1987 |
| GB | 1380045 A | 1/1975 |

(Continued)

OTHER PUBLICATIONS

S. Loheide et al., "New procedure for wavefront reconstruction", Optik 108, No. 2 (1998) 53-62, Gustav Fischer Verlag.

(Continued)

*Primary Examiner* — Michael A Lyons
*Assistant Examiner* — Jonathan Hansen
(74) *Attorney, Agent, or Firm* — Sughrue Mion, PLLC (57) ABSTRACT

Methods and systems for measuring a surface of an object are provided, wherein portions of the surface of the object are interferometrically measured and data representing a shape of the surface of the object are obtained by stitching the measurement data corresponding to each portion together. For measuring the individual portions of the surface of the object a variable light shaping member is utilized preferably constructed by arranging two diffraction gratings in a beam path of measuring light and appropriately displacing the two diffraction gratings relative to each other depending on a target shape of a particular portion of the surface of the object.

8 Claims, 8 Drawing Sheets

FOREIGN PATENT DOCUMENTS

JP 10-073542 3/1998
WO WO 2005/114101 A1 12/2005

OTHER PUBLICATIONS

E. Papastathopoulos et al., "Chromatic confocal spectral interferometry", Applied Optics, vol. 45, No. 32, Nov. 10, 2006, 8244-8252.

I. Weingartner et al., "Tracing back radius of curvature and topography to the base unit of length with ultra-precision", Recent Developments in Traceable Dimensional Measurements, J. E. Decker, N. Brown, Editors, Proceedings of SPIE vol. 4401 (2001), pp. 175-183.

C. Elster et al., "Coupled distance sensor systems for high-accuracy topography measurement: Accounting for scanning stage and systematic sensor errors", Precision Engineering 30 (2005), pp. 32-38.

M. Schulz et al., "Traceable mutliple sensor system for measuring curved surace profiles with high accuracy and high lateral resolution", Optical Engineering, Jun. 2006, vol. 45(6), pp. 060503-1 to 060503-3.

J. Gerhardt et al., "High-accuracy profile form measurement by a scanning system consisting of an angle sensor and coupled distance sensors", Optical Measurement Systems for Industria Inspection IV, edited by W. Osten et al., Proc. of SPIE vol. 5856, pp. 385-392.

I. Weingartner et al., "System of four distance sensors for high-accuracy measurement of topography," Precision Engineering 29 (2004) pp. 164-170.

C. Elster et al., "Reconstructing surface profiles from curvature measurements", Optik 113, No. 4 (2002), pp. 154-158.

M. Scepanovic et al., Design and processing of high-density single-mode fiber arrays for imaging and parallel interferometer applications, in: Applied Optics, vol. 43, No. 21, Jul. 2004, 4150-4156.

J. L. De Bougrenet De La Tocnaye, et al., "Complex amplitude modulation by use of liquid-crystal spatial light modulators", Appl. Opt. vol. 36, No. 8, Mar. 10, 1997, 1730-1741.

Jon Fleig et al., "An automated subaperture stitching interferometer workstation for spherical and aspherical surfaces", Proceedings of SPIE vol. 5188 (2003), San Diego, CA.

QED Technologies, Company Literature: Introducing the $SSI_A$ full-aperture asphere metrology—optical nulls not required. www.qedmrf.com.

M. Bray, "Stitching Interferometer for large optics: recent developments of a system for laser megajoule components", Lawrence Livermore Nat. Lab; CEA.—In: Proc. SPIE—Int. Soc. Opt. Eng. (USA), USA: SPIE—Int. Soc. Opt. Eng., vol. 3492, pt. 1-2 [+suppl.], 1999, pp. 946-956.

M. Tricard et al., Subaperture stitching interferometer (SSI), QED Technologies, M. Tricard Aug. 17, 2004, www.gedmrf.com.

* cited by examiner

METHOD AND SYSTEM FOR MEASURING A SURFACE OF AN OBJECT

This application claims the benefit of U.S. Provisional Application No. 60/975,000, filed Sep. 25, 2007, which is incorporated into the present application in full by reference.

BACKGROUND OF THE INVENTION

1. Field of the Invention

The present invention relates to a method and a system for measuring a surface of an object. In particular, the present invention relates to a method and a system for measuring a surface of an object by successively measuring different portions of the surface by an interferometric technique.

Further, the present invention relates to an optical system for shaping a light beam. In particular, the present invention relates to an optical system for shaping a light beam comprising two diffraction gratings.

2. Brief Description of Related Art

A shape of a surface of an object, in particular an optical element, such as a lens or a mirror, can be measured by an optical interferometric method. Conventionally, a beam of measuring light is generated comprising wavefronts corresponding to a target shape of the surface of the object to be measured. Thus, the beam of measuring light is incident substantially orthogonal to the surface of the object to be measured. The beam of measuring light being reflected from the surface of the object to be measured is superimposed with reference light and the resulting interferogram as detected by a spatially resolving detector. From the interferogram deviations of the shape of the surface of the object from the target shape can be determined.

Forming of the measuring light in order to comprise wavefronts having a shape corresponding to a target shape is in particular difficult, when the surface of the object to be measured has an irregular shape and a large extension. The optics for forming an appropriate beam of measuring light are also commonly referred to as K-systems, null lens arrangements or compensators. For measuring large surfaces of an object a so-called "stitching methodology" has been developed as described in the article by M. Bray, Proc. SPIE, Vol. 3492, 946 (1999). From this article a method of testing a large mirror having a spherical shape by performing interferometric tests at a plurality of overlapping portions or sub-apertures of the optical surface is known. Each portion has a lower diameter than the surface to be measured. Measured surface data of each portion are then stitched together to generate surface data representing a map of the surface shape of the tested mirror.

From WO 2005/114101 A1 an interferometric method employing the stitching methodology is known to measure an aspherical optical surface having a rotational symmetry.

The conventional methods and systems however do not allow to accurately measure aspherical surfaces, in particular they do not allow to accurately measure aspherical surfaces having a large extension.

SUMMARY OF THE INVENTION

The present invention has been accomplished taking the above problems into consideration.

It is an object of the present invention to propose methods and systems capable of measuring a surface having an aspherical shape. In particular, the surface to be measured may be a surface of an optical element, such as a lens or a mirror. In particular, It is an object of the present invention to provide methods and systems capable of measuring a large surface having an aspherical shape.

It is a further object of the present invention to provide an optical system for shaping a light beam. In particular, it is an object of the present invention, to provide an optical system for shaping a light beam capable of shaping the light beam in a variable manner.

Embodiments of the present invention provide methods and systems for optically measuring a surface of an object by interferometry. Embodiments of the present invention provide methods and systems for measuring a surface of an object employing a variable light shaping member.

According to an embodiment, a method of measuring a surface of an object comprises traversing a variable light shaping member with a first portion of measuring light; illuminating a first portion of the surface of the object with the first portion of the measuring light having traversed the variable light shaping member; detecting light emanating from the first portion of the surface, the light being superimposed with a second portion of the measuring light by interference; modifying at least one optical property of the variable light shaping member; displacing the surface of the object, to illuminate a second portion of the surface of the object with the first portion of the measuring light having traversed the variable light shaping member; and detecting light emanating from the second portion of the surface, the light being superimposed with the second portion of the measuring light by interference.

The variable light shaping member may have a cross section extending in an area. The modifying at least one optical property of the variable light shaping member may comprise modifying at least one optical property at least one location of the area.

The displacing the surface of the object may comprise displacing the surface of the object relative to at least one of the variable light shaping member and the measuring light.

The measuring light has a large coherence length and may be generated by a laser. After generating the measuring light, the measuring light may traverse a collimating optics to appropriately collimate the measuring light. The first portion of the measuring light traverses the variable light shaping member that may extend in a cross section thereof in an area transverse, in particular orthogonal, to a direction of the measuring light traversing the variable light shaping member. In particular, the measuring light is a beam of measuring light having a cross sectional size corresponding to the size of the area of the variable light shaping member. The measuring light traversing the variable light shaping member may comprise plane wavefronts. Upon traversing the variable light shaping member, the plane wavefronts may be deformed to correspond to a target shape of the portion of the surface of the object being illuminated with the first portion of the measuring light having traversed the variable light shaping member.

The first portion of the surface of the object may have a different shape than the second portion of the surface of the object. In this case, the deformation of the wavefronts of the first portion of the measuring light are different when the first portion of the surface of the object or the second portion of the surface of the object is illuminated with the first portion of the measuring light having traversed the variable light shaping member.

In order to achieve the different deformations of the first portion of the measuring light from plane wavefronts, at least one optical property at least one location of the area of the variable light shaping member is modified when illumination of the first portion of the surface of the object is switched to illumination of the second portion of the surface of the object.

In general, the at least one optical property is controllable at a plurality of locations of the area of the variable light shaping member. The modifying of the at least one optical property may be controlled based on a target shape of the first portion of the surface or the second portion of the surface being illuminated, respectively.

According to an embodiment of the present invention, a method of measuring a surface of an object comprises illuminating a first portion of the surface of the object with a first portion of measuring light; traversing a variable light forming member with a second portion of the measuring light; detecting light emanating from the first portion of the surface, the light being superimposed with the second portion of the measuring light having traversed the variable light shaping member; modifying at least one optical property of the variable light shaping member; displacing the surface of the object, to illuminate a second portion of the surface of the object with the first portion of the measuring light; and detecting light emanating from the second portion of the surface, the light being superimposed with the second portion of the measuring light having traversed the variable light shaping member.

According to this embodiment, the first portion of the measuring light illuminates different portions of the surface of the object without having traversed the variable light shaping member. Instead, the second portion of the measuring light traverses the variable light forming member. Similarly as the above described embodiment, at least one optical property at least one location of the area of the variable light shaping member is modified when switching from illuminating the first portion of the surface of the object to illuminating the second portion of the surface of the object. According to this embodiment, generally, the first portion of the measuring light is not orthogonally incident onto either the first portion or the second portion of the surface of the object.

According to an embodiment of the present invention, the at least one optical property of the variable light shaping member is at least one of a degree of an absorption of the measuring light and a degree of a phase-shift of measuring light at one location relative to another location of a cross section of the variable light shaping member. By controlling the absorption or the phase-shift experienced by the measuring light upon traversing the variable light shaping member, it is possible to appropriately shape wavefronts of the measuring light having traversed the variable light shaping member. In general, traversing the variable light shaping member, comprises interacting with the variable light shaping member and emanating therefrom, such as transmitting the variable light shaping member or reflecting from the variable light shaping member.

According to an embodiment of the present invention, a degree of modifying the at least one optical property of the variable light shaping member at the location of the area depends on an amount of the displacement of the surface of the object relative to the variable light shaping member. In particular, the larger the amount of the displacement of the surface of the object, the larger the degree of modifying the at least one optical property of the variable light shaping member.

According to an embodiment of the present invention, the variable light shaping member is formed by a liquid crystal field, wherein the modifying the at least one optical property of the variable light shaping member comprises modifying an electric field at least one location of the liquid crystal field. Modifying the electric field at the location results in modifying at least one optical property at this location of the area of the variable light shaping member.

According to an embodiment of the present invention, the variable light shaping member comprises two diffraction gratings arranged in a beam path of the measuring light, wherein the modifying the at least one optical property at the at least one location of the area of the variable light shaping member comprises displacing the two diffraction gratings relative to each other.

In particular, two diffraction gratings may be successively arranged in the beam path of the measuring light.

In particular, the displacing the two diffraction gratings relative to each other comprises modifying the at least one optical property at a plurality of locations of an area of a cross section of the variable light shaping member.

According to an embodiment of the present invention, the displacing the two diffraction gratings relative to each other comprise at least one of rotating and translating the diffraction gratings relative to each other.

According to an embodiment of the present invention, an amount of the displacement of the diffraction gratings relative to each other depends on at least one of an amount and a direction of the displacement of the surface of the object. In particular, the displacement of the diffraction gratings relative to each other may be the greater the greater the amount of the displacement of the surface of the object is.

According to an embodiment of the present invention, both diffraction gratings comprise a substrate in which substantially a same phase-function is implemented. This provides a very simple construction of the variable light shaping member. The phase-function may be symmetric in one direction of the area and may be anti-symmetric in an other direction of the area of the variable light shaping member.

According to an embodiment of the present invention, the first portion and the second portion of the surface of the object each comprise less than 80% of a total surface area of the object.

According to an embodiment of the present invention, the detecting the light emanating from at least one of the first and the second portion of the surface comprises acquiring images using a spatially resolving detector. The detector may be for example a CCD camera or a CMOS sensor.

According to an embodiment of the present invention, the interferometric method further comprises evaluating an intensity of the detected light having emanated from at least one of the first portion and the second portion of the surface of the object, to obtain measuring data representing a surface shape of the surface.

According to an embodiment of the present invention, substantially an entire surface of the object is measured by repeated application of the illuminating and the detecting to different portions of the surface and repeated application of the modifying at least one optical property.

According to an embodiment of the present invention, a method of manufacturing an optical element is provided comprising determining measuring data representing a surface shape of the optical element according to a method of the present invention; processing the optical element based on the measuring data representing the surface shape of the optical element comprising at least one of planing, grinding, etching, polishing, processing using a particle beam and applying a protective coating. Thus, in particular optical elements such as a lens or a mirror may be manufactured. This optical element may for example be used in objectives, in particular in objectives used for lithography techniques employed for manufacturing semiconductor devices.

According to an embodiment of the present invention, a system for measuring a surface of an object is provided, the system comprising an interferometer comprising a light source for generating measuring light; a variable light shaping member; and a spatially resolving detector, wherein the light source and the variable light shaping member are arranged and configured to allow the measuring light to be incident on at least a portion of the surface of the object after traversing the variable light shaping member, wherein the detector is arranged and configured to detect light being formed by superposition of measuring light emanating from the surface of the object and reference light.

The light source may be a laser generating measuring light having a large coherence length. The measuring light may be formed as a beam of measuring light having a cross sectional size corresponding to an area of a cross section of the variable light shaping member. The system may further comprise an object holder for holding the object and displacing the object such that different portions of the surface of the object may be illuminated with the measuring light. Further, the system may comprise a controller for controlling at least one optical property at at least one location of the area of the variable light shaping member.

According to an embodiment of the present invention, a system for measuring a surface of an object is provided, the system comprising an interferometer comprising a light source for generating measuring light; a variable light shaping member; and a spatially resolving detector, wherein the light source and the detector are arranged and configured to allow the measuring light to be incident on at least a portion of the surface of the object, such that the detector detects the measuring light emanating from the portion of the surface, and wherein the light source, the variable light shaping member and the detector are further arranged and configured to allow the measuring light to be incident on the detector after traversing the variable light shaping member in order to be detected by the detector. Traversing the variable light shaping member may comprise interacting with the variable light shaping member by the measuring light and emanating therefrom, thus including transmitting and reflecting.

According to an embodiment of the present invention, the variable light shaping member is configured such that at least one of the following holds: a ratio of an amplitude of measuring light being incident on a location of a cross section of the variable light shaping member and emanating from the location is adjustable to be greater than 0.2, in particular greater than 10, further in particular greater than 100; a ratio of an amplitude of measuring light being incident on a location of a cross section of the variable light shaping member and emanating from the location is adjustable to be less than 1.5, in particular less than 1.2, further in particular less than 1.1; an amount of a difference of a phase of measuring light being incident on a location of a cross section of the variable light shaping member and emanating from the area is adjustable to be greater than $\pi/2$, in particular greater than $\pi$, further in particular greater than $2\pi$; and an amount of a difference of a phase of measuring light being incident on a location of a cross section of the variable light shaping member and emanating from the location is adjustable to be smaller than $\pi/10$, in particular smaller than $\pi/100$. Thus, the variable light shaping member be adjustable to absorb the measuring light to a large or small degree as desired and may be adjustable to change a phase of the measuring light by a large or a small amount as desired upon traversing the variable light shaping member. Thus, a desired shape of a wavefront of measuring light having traversed the variable light shaping member is achievable.

According to an embodiment of the present invention, the variable light shaping member comprises a transparent liquid crystal field. Properties of the liquid crystal field may be adjustable by a controller.

According to an embodiment of the present invention, the variable light shaping member comprises two diffraction gratings successively arranged in a direction of the traversing measuring light, wherein the two diffraction gratings are displaceable relative to each other. Thereby, a simple construction of the variable light shaping member is provided.

According to an embodiment of the present invention, the two diffraction gratings each comprise a substrate having optical diffraction structures arranged thereon implementing substantially a same phase-function. Thus, a construction of the variable light shaping member is even simplified.

According to an embodiment of the present invention, the system further comprises an object holder for holding the object, wherein the interferometer and the object holder are displaceable relative to each other. Thereby, it is possible to measure different portions of the surface of the object in order to cover substantially the entire surface of the object. Measuring data acquired from the individual portions of the surface of the object are then combined (stitched together) to determine measuring data representing a shape of the entire surface of the object.

According to an embodiment of the present invention, at least one of a three-axis positioning apparatus is provided for displacing the interferometer and an azimuthal pivot bearing is provided for displacing the object holder.

According to an embodiment of the present invention, a method according to an embodiment of the present invention is performed using a system according to an embodiment of the present invention.

Embodiments of the present invention provide an optical system for shaping a light beam. Shaping the light beam may comprise modifying a shape of a wavefront of the light beam.

According to an embodiment of the present invention, the optical system for shaping a light beam comprises a first diffraction grating and a second diffraction grating (successively) arranged in a beam path of the optical system; and a controller being adapted to control displacing the two diffraction gratings relative to each other based on an input value.

According to an embodiment of the present invention, the displacing of the two diffraction gratings relative to each other comprises at least one of rotating and translating the two diffraction gratings relative to each other.

In particular, the rotating may comprise rotating about a direction of the beam path, the translating may comprise translating transverse, in particular orthogonal, to the direction of the beam path.

According to an embodiment of the present invention, at least one optical property of the optical system can be modified by displacing the two diffraction gratings relative to each other. Thus, changing one optical property of the optical system is achievable by a simple movement of the two diffraction gratings relative to each other.

According to an embodiment of the present invention, the optical property is at least one of a focal length and an astigmatism. In particular, the focal length of the optical system may be modified by displacing the two diffraction gratings along a first direction in a plane of a cross section of the variable light saving member and the astigmatism of the optical system may be modified by displacing the two diffraction gratings relative to each other along a second direction in the plane of the cross section of the variable light saving member.

The plane of the cross section of the variable light shaping member may be oriented transverse, in particular orthogonal, to the direction of the beam path. Each of the two diffraction gratings may extend in an area parallel to the plane of the cross section.

According to an embodiment of the present invention, the two diffraction gratings each comprise a substrate on which a same phase-function is implemented. A phase-function describes how a phase of the light beam is influenced upon traversing the first or the second diffraction grating. The phase-function may be implemented on the substrate of each of the two diffraction gratings by arranging grating forming structures thereon, in particular in a periodic manner. Each grating forming structure influences at least one of an amplitude and a phase of the light beam traversing the diffraction grating.

According to an embodiment of the present invention, the first diffraction grating comprises a first region of the substrate of the first diffraction grating and the second diffraction grating comprises a second region of the substrate of the second diffraction grating, wherein the two regions each comprise at least 80% of a total area of the respective diffraction grating and wherein for an optimal relative alignment of the first region and the second region with respect to a structural coincidence of both diffraction gratings an average of an amount of a difference between local reciprocal lattice vectors of both diffraction gratings is less than 10/mm, in particular 5/mm, further in particular 1/mm. The grating forming structures exhibit a locally periodic arrangement which allows assignment of a local primitive lattice vector. A length of the primitive local lattice vector corresponds to the period of the grating forming structures, i.e. a smallest distance between corresponding grating forming structures. The local reciprocal lattice vector is substantially the inverse of the local primitive lattice vector. If an identical, i.e. an exactly same, phase-function is implemented in the first diffraction grating and the second diffraction grating, a difference between local reciprocal lattice vectors of the first diffraction grating and the second diffraction grating is substantially zero. To achieve an optimal relative alignment of the first region of the first diffraction grating and the second region of the second diffraction grating, a rotation or a translation of one of the diffraction gratings may be required.

According to an embodiment of the present invention, an objective or an interferometer comprises an embodiment of the optical system.

According to an embodiment of the present invention, the system for measuring a surface of an object comprises an optical system having a first and a second diffraction grating according to an embodiment of the present invention.

BRIEF DESCRIPTION OF THE DRAWINGS

The forgoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

FIG. 2A,

DETAILED DESCRIPTION OF EXEMPLARY EMBODIMENTS

In the exemplary embodiments described below, components that are alike in function and/or structure are designated as far as possible by alike reference numerals. Therefore, to understand the features of the individual components of a specific embodiment, the descriptions of other embodiments and of the summary of the invention should be referred to.

Figure 1:
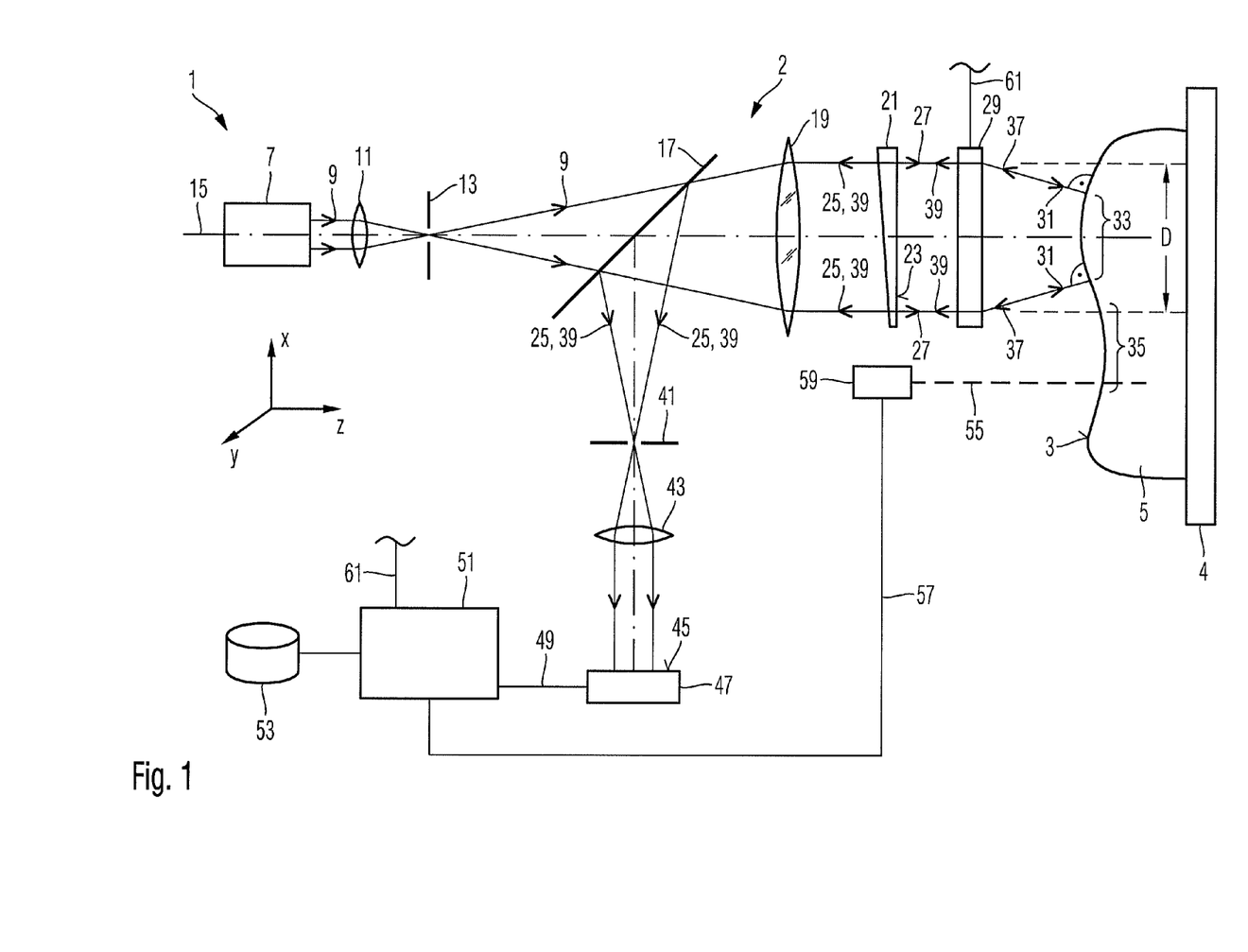
FIG. 1 schematically illustrates a system for measuring a surface of an object according to an embodiment of the present invention.

FIG. 1 schematically illustrates a system 1 for measuring a surface 3 of an object 5 according to an embodiment of the present invention. An interferometer 2 includes a laser light source 7, to generate measuring light 9 that is constituted of essentially plane wavefronts. Measuring light 9 traverses a collimator 11 to be collimated at a pin hole of an aperture 13. Measuring light 9 emerges from the pin hole substantially as spherical wavefronts. Measuring light 9 traverses a semi-transparent plate 17 and is incident on a collimating lens 19. Upon traversing the collimating lens 19, the spherical wavefronts of the measuring light 9 are transformed to substantially parallel wavefronts. Having traversed the collimating lens 19 the measuring light 9 is incident on a wedge-shaped plate 21 whose back face 23 is oriented orthogonal to the optical axis 15 of the system 1. The face 23 of the wedge-shaped plate 21 acts as a reference face for generating reference light 25 by reflecting a portion of the reference light 9. Another portion 27 of the measuring light 9 traverses the wedge-shaped plate 21 and is incident on a variable light shaping member 29.

In different variants of the system 1 illustrated in FIG. 1 the variable light shaping member may have different constructions, as will be explained below. In general, the variable light shaping member 29 extends in an area in the x-y-plane. A lateral extension of the variable light shaping member along the x-direction amounts to D. The variable light shaping member 29 modifies a shape of the plane wavefronts constituting the portion 27 of the measuring light such that the shaped measuring light 31 emanating from the variable light shaping member 29 is orthogonally incident on the surface 3 of the object 5 at each location within a portion 33 of the surface 3 of the object 5 illuminated with the shaped measuring light 31.

In the illustrated example, the object 5 has a convex surface in the portion 33 of the surface 3. Thus, a lateral extension of the portion 33 in the x-direction is smaller than the extension D of the area of the variable light shaping member 29. When measuring other portions of the surface 3 of the object 5, for example portion 35 having a concave shape, this situation may be reversed.

The shaped measuring light 31 is incident onto the portion 33 of the surface 3 of the object 5 and is reflected therefrom as probing light 37. The probing light 37 travels back substantially the same path as the shaped measuring light 31 travels towards the object 5 only if the shape of the surface 3 of the object 5 in the portion 33 matches a target shape of the surface 3 of the object 5 in the portion 33. If there are deviations from the target shape, the probing measuring light 37 will travel a slightly different path than the path traveled by the shaped measuring light 31 towards the object 5. Thus, a shape of wavefronts constituting the probing measuring light 37 will deviate from a shape of wavefronts constituting the shaped measuring light 31.

The probing measuring light 37 traverses the variable light shaping member 29 to be transformed into light 39 constituted by substantially plane wavefronts. Deviations of a shape of the wavefronts 39 from plane wavefronts depend on deviations of the target shape of the surface 3 of the object 5 in the portion 33 from the actual shape of the surface 3 of the object 5 in this portion. Probing measuring light 39 further traverses the wedge-shaped plate 21 to be superimposed with the reference light 25 generated by reflection of measuring light 9 from the reference face 23. The superimposed light 25, 39 is collimated by the collimating lens 19, to form substantially spherical wavefronts. The superimposed light 25, 39 is reflected by the semitransparent plate 17, is focused in a pin hole of an aperture 41, traverse a imaging optics 43 to be imaged to a light sensitive surface 45 of a detector 47.

The detector 47 is a CCD detector comprising a two-dimensional array of pixels each of which detecting an intensity of the superimposed light 25, 39. As the measuring light 9 is highly coherent light having a large coherence length, the two portions 25 and 39 of the measuring light 9 having traversed different optical path lengths are able to interfere. Thereby, an interference pattern representing a deviation of the shape of the surface 3 of the object 5 in the portion 33 from a target shape of the surface 3 of the object 5 in this portion is acquired. Electrical signals generated by the detector 47 based on the intensities of the interference pattern detected by the individual pixels are supplied by signal line 49 to a control and processing system 51. The control and processing system 51 computes data representing the shape 3 of the object 5 in the portion 33 based on the acquired interferogram. These surface shape data may be stored in a database 53.

Portion 33 of the surface 3 of the object 5 represents only a small fraction of an entire area of the surface 3 of the object 5. In order to determine surface shape data of the entire surface 3 of the object 5 the measuring method explained above applied to portion 33 of the surface 3 of the object 5 is applied to multiple other portions, preferable overlapping with each other, of the surface 3 of the object 5. For this purpose, the object 5 is displaced relative to the interferometer 2. In the embodiment illustrated in FIG. 1 the displacement of the object 5 relative to the interferometer 2 comprises a rotation of the object holder 4 holding the object 5 around an axis 55. The rotation is triggered by the control and processing system 51 by supplying a control signal via signal line 57 to an actuator 59. The actuator 59 rotates the object holder 4 around the axis 55 by a desired rotation angle. Thereby, another portion 33' not illustrated in FIG. 1 will be positioned to be illuminated by shaped measuring light 31. However, the other portion 33' of the surface 3 of the object 5 will have in general a target shape different from the target shape of the portion 33 of the surface 3 of the object 5. Again, for this other portion 33' of the surface 3 of the object 5 it must be ensured that the shaped measuring light 31 is constituted by wavefronts having a shape corresponding to the target shape of the other portion 33' of the surface 3 of the object 5. Therefore, the control and processing system 51 sends via signal line 61 control signals to the variable light shaping member 29 in order to modify at least one optical property at least one location within the lateral extension of the variable light shaping member 29. Depending on the variant of the variable light shaping member 29 employed, the modifying the optical property at at least one location of the variable light shaping member 29 is performed differently. These variants will be described below.

Figure 2A:
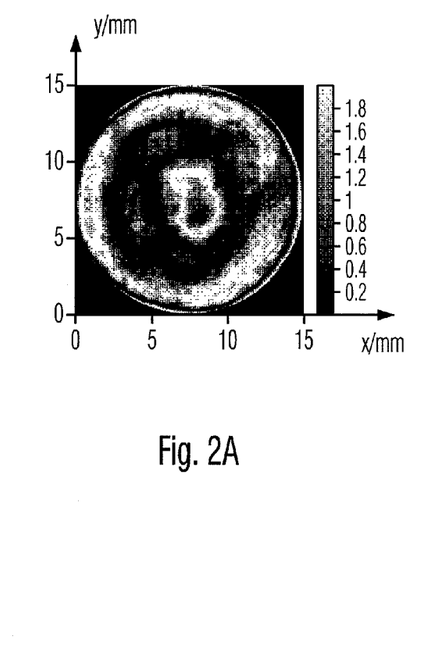
Figure 2B:
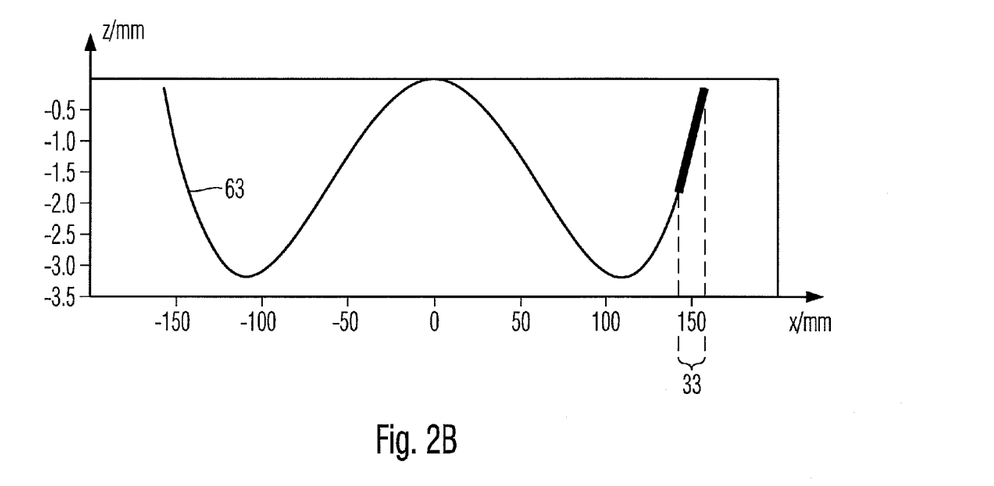
FIG. 2B illustrate diagrams of measurement results obtained by the system for measuring an aspheric surface of an object illustrated in FIG. 1.
Figure 2C:
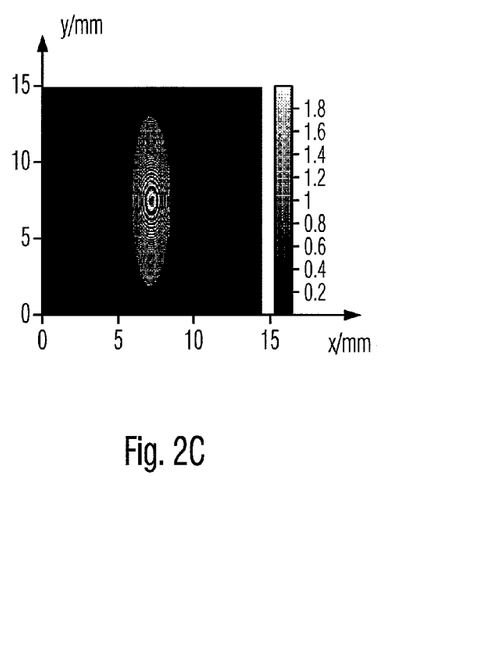
FIG. 2C illustrates a diagram of measurement results using a conventional system for measuring an aspheric surface of an object.

FIGS. 2A, 2B and 2C illustrate diagrams of interferometric measurements, wherein the diagram illustrated in FIG. 2C is obtained by embodiments of the present invention and the diagrams illustrated in FIGS. 2C and 2D are obtained using a conventional system. In a system according to an embodiment of the present invention and in the conventional system a surface of a lens having an aspheric shape (3.2 mm deviation from a sphere having a lens diameter of 300 mm) was measured using the stitching methodology. The lateral extension of the sub-aperture defining the extension of the measurement area (corresponding to the lateral extension D in FIGS. 1 and 3) was 15 mm. FIG. 2B illustrates a graph showing a curve 63 representing a deviation of the surface shape of the measured aspherical lens from a best approximating sphere in dependence of a lateral dimension in the x-direction. The plotted deviation represented by curve 63 assumes low values near an outer edge of the lens and increases then towards the center of the lens to high value amounting up to −3.2 mm. From the extreme value of −3.2 mm the deviation decreases towards the center of the lens, where a value of zero is assumed. Using a sub-aperture having a size of 15 mm, the portion 33 located close to an outer edge of the lens was measured.

FIG. 2A illustrates the interferogram obtained by measuring the portion 33 of the aspherical lens using the system 1 illustrated in FIG. 1 according to an embodiment of the present invention. While measuring the interferogram illustrated in FIG. 2A the variable light shaping member 29 was adjusted by the control and processing system 51 to generate shaped measuring light 31 having wavefronts corresponding to a target shape of the aspherical lens in the portion 33. It is apparent that the interferogram shows intensity variations across the entire extension of 15 mm of the sub-aperture. Thus, surface shape data across the entire sub-aperture size can be obtained from the interferogram illustrated in FIG. 2A.

FIG. 2C illustrates the interferogram obtained by a conventional system. In this case, the shaped measuring light 31 was not formed to comprise wavefronts having a shape corresponding to the target shape in the portion 33 of the aspherical lens but instead corresponding to an spherical approximation of the target shape. Therefore, only shaped measuring light 31 being incident within a region of size 3 mm×10 mm within the portion 33 of the surface of the aspherical lens was superimposed with the reference light and reached the detector. Thus, only a small stripe of size 3 mm×10 mm of the sub-aperture of size 15 mm×15 mm can be evaluated to obtain surface shape data of the aspherical lens. Thus, the conventional system acquires a much larger number of sub-apertures each having a smaller size than the system according to the present invention, resulting in longer measuring times.

In the embodiment illustrated in FIG. 1 of a system for measuring a surface of an object, the first portion of the measuring light 9 is incident on the surface 3 of the object 5 after having traversed the variable light shaping member 29 and is then reflected from the surface 3 within the portion 33. The reflected measuring light is then superimposed with reference light and the interferogram is detected.

However, in other embodiments of the present invention, the first portion of the measuring light is incident on the surface 3 of the object 5 without having traversed the variable light shaping member 29.

Figure 3:
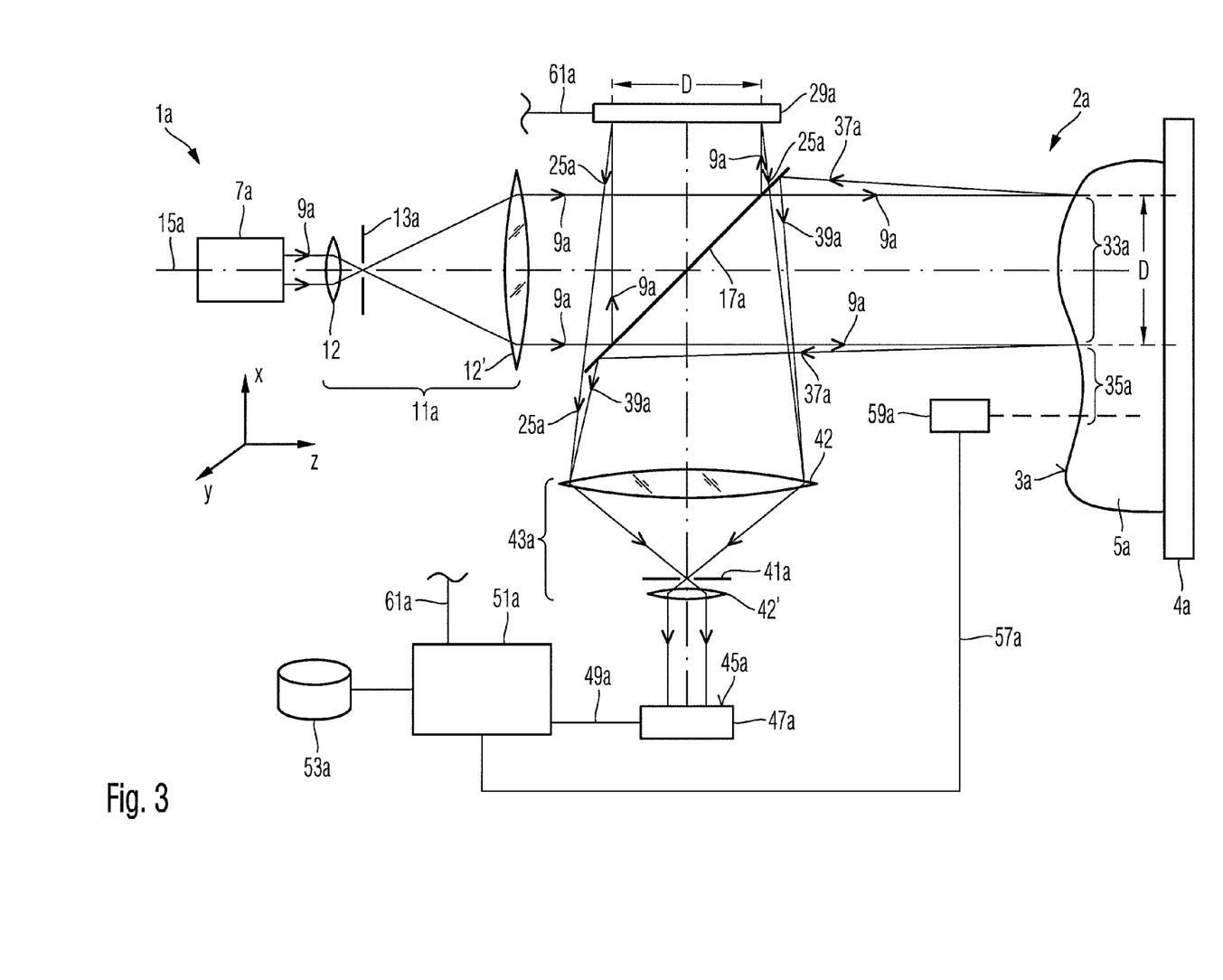
FIG. 3 schematically illustrates another embodiment of a system for measuring a surface of an object according to the present invention.

FIG. 3 schematically illustrates an example of an embodiment 1a of such a system. The laser light source 7a generates measuring light 9a which traverses a lens 12, a pin hole of an aperture 13a and a lens 12' to widen a cross sectional size of the beam of measuring light to a diameter D, wherein the widened beam of measuring light 9a is constituted by substantially plane wavefronts. The measuring light 9a traverses a semitransparent plate 17a and is incident on the surface 3a of an object 5a in a portion 33a. The measuring light is reflected as probing measuring light 37a at the portion 33a of the surface 3a of the object 5a. Due to the curved shape of the portion 33a of the surface 3a of the object 5a the reflected measuring light 37a traverses a path different from the path of the measuring light 9a being incident on the portion 33a of the surface 3a. In particular, the curved shape in the region 33a is an aspherical shape. Therefore, wavefronts constituting the reflected measuring light 37a also have an aspherical shape. The reflected measuring light 37a is reflected at a semitransparent plate 17a, to form probing measuring light 39a.

A portion of the widened measuring light 9a is reflected at the semitransparent plate 19a and is incident in an area of size D on the variable light shaping member 29a. In the embodiment illustrated in FIG. 3 the variable light shaping member 29 is a reflection type variable light shaping member. The optical properties at each location within the area of lateral extension D are controlled via signal line 61a by the control and processing system 51a.

The optical properties are adjusted such that the reference light 25a emanating from the variable light shaping member 29a upon impingement of the widened measuring light 9a is constituted by wavefronts having a shape corresponding to a target shape of the shape of the surface 3a of the object 5a in the portion 33a. The reference light 25a traverses the semitransparent plate 17a and is superimposed with the probing measuring light 39a forming the superimposed light 25a, 39a. The superimposed light 25a, 39a traverses a lens 42, a pin hole of an aperture 41a and a lens 42' to be imaged on a light sensitive surface 45a of a detector 47a as an interferogram.

If the shape of the surface 3a of the object 5a in the portion 33a deviates from the target shape represented by the shape of the wavefronts of the reference light 25a, the detected interferogram will exhibit intensity variations indicative of these deviations. Electrical signals representing the detected interferogram are supplied via signal line 49a to the control and processing system 51a which is adapted to determine surface shape data representing the shape of the surface 3a of the object 5a in the portion 33a.

In order to gain surface shape data from another portion, such as portion 35a, the object holder 4a holding the object 5a is displaced relative to the interferometer 2a. A particular embodiment of a positioning system will be described below with reference to FIG. 7. In the embodiment illustrated in FIG. 3 the object holder 4a may be rotated around an axis 55a via an actuator 59a which is controlled by the control and processing system 51a via signal line 57a. Further, the object holder 4a may be displaceable relative to the interferometer 2a by lateral translations in the x-direction and y-direction. Thereby, the object holder 4a is positioned such that the portion 35a of the surface 3a of the object 5a is illuminated with the widened measuring light 9a. Further, the variable light shaping member 29a is controlled by the control and processing system 51a to modify its optical properties such that the reference light 25a emanating from the variable light shaping member 29a now is constituted by wavefronts having a shape corresponding to a target shape of the surface 3a of the object 5a in the portion 35a. Again, an interferogram formed by detection of superimposed reference light 25a and probing measuring light 39a originating by reflecting the widened measuring light 9a at the portion 35a of the surface 3a of the object 5a is acquired. The control and processing system 51a processes electrical signals supplied from the detector 47a representing the interferogram, to determine surface shape data representing the shape of the surface 3a of the object 5a in the portion 35a. In an analogous manner other portions of the surface 3a of the object 5a are measured and the resulting surface shape data corresponding to each such portion are combined (stitched together) to obtain surface shape data representing a shape of the entire surface 3a of the object 5a.

As mentioned above, the present invention provides for each of the embodiments illustrated in FIG. 1 and FIG. 3 different variants of the construction of the variable light shaping member 29 and 29a, respectively. In one variant the variable light shaping member is realized by a liquid crystal spatial light modulator, as for example described in the article of J. L. de Bougrenet de al Tocnaye et al., "Complex amplitude modulation by use of liquid-crystal spatial light modulators", Appl. Opt. Vol. 36, No. 8, 10 Mar. 1997. In particular in this case the measuring light 9, 9a may be polarized measuring light, in particular linearly polarized measuring light.

Another variant of the variable light shaping member to be used in the embodiments illustrated in FIG. 1 or 3 will be described with reference to FIGS. 4A to 4E, FIGS. 5A to 5A and FIGS. 6A to 6E.

Figure 4A:
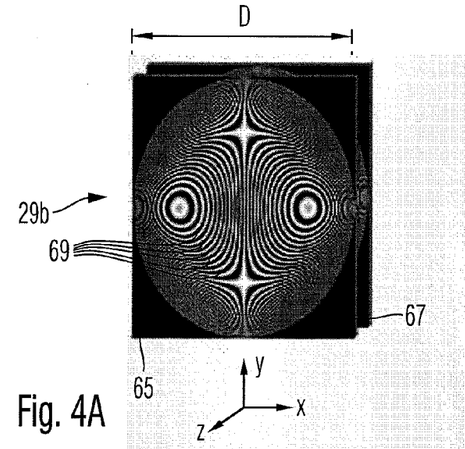
FIG. 4A, FIG. 4B, FIG. 4C, FIG. 4D, FIG. 4E, FIG. 4F schematically illustrate a variable light shaping member comprising two diffraction gratings according to an embodiment of the present invention.

FIG. 4A schematically illustrates a variable light shaping member 29b that can be used as variable light shaping member 29 or 29a in the embodiments illustrated in FIGS. 1 and 3, respectively. Further, variable light shaping member 29b can be used as an optical system having variable optical properties in other optical systems, such as in objectives.

Figure 4B:
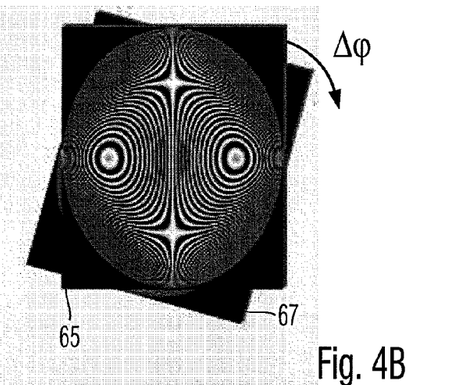
Figure 4C:
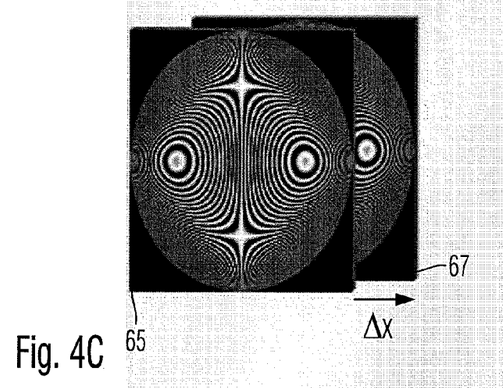
Figure 4D:
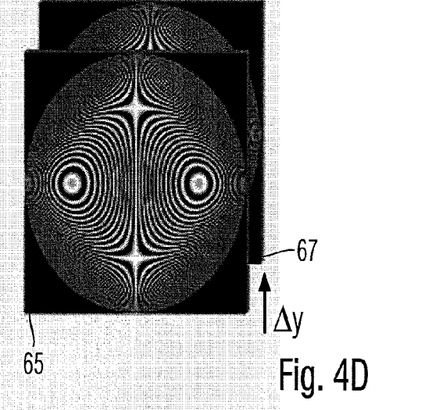
Figure 4E:
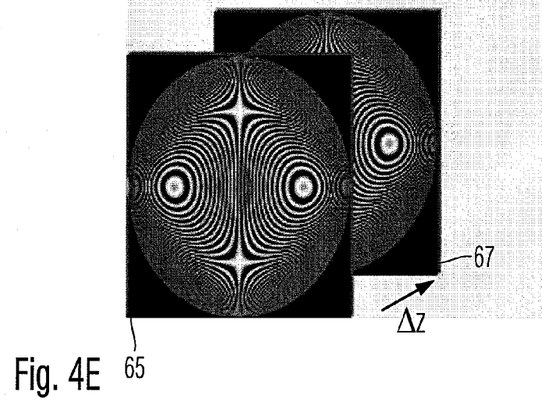
Figure 4F:
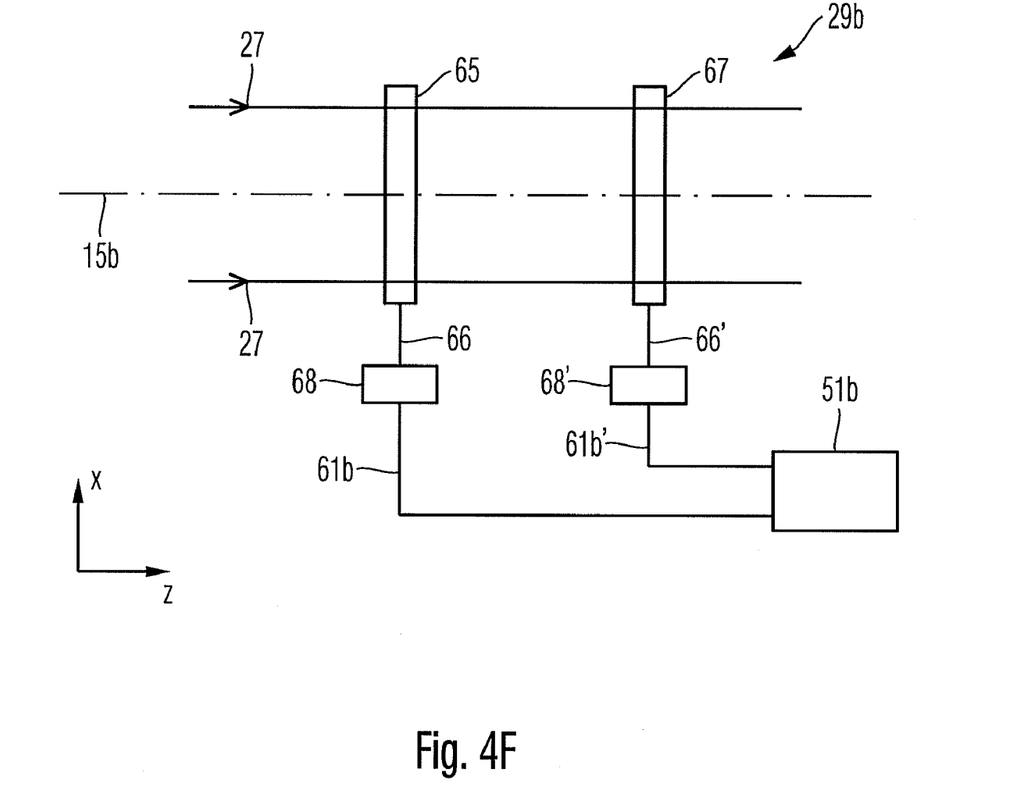

The variable light shaping member 29b illustrated in FIG. 4A is illustrated in a plane view in the x-y-plane and in a side view in FIG. 4F. The variable light shaping member 29b extends in an area in the x-y plane having a lateral extension D. The extension D corresponds to a size of a sub-aperture for illuminating a portion of a surface of an object when employing the stitching methodology for measuring a shape of the surface of the object. The lateral extension D may range in the order of 5 mm to 30 mm. When arranged in a system for measuring a surface of an object, the measuring light may in particular be incident orthogonally to the drawing plane of FIG. 4A.

The variable light shaping member 29b comprises two diffraction gratings 65 and 67 successively arranged in a direction z of the traversing measuring light 27. The first diffraction grating 65 and the second diffraction grating 67 are displaceable relative to each other. As illustrated in FIG. 4F each of the diffraction gratings 65, 67 is connected to a shaft 66 and 66', respectively, which in turn are connected to actuators 68, 68', such as an electric motor or a piezo element. The actuators 68, 68' may change the position and orientation of the diffraction gratings 65, 67 relative to each other. For this, the actuators 68, 68' are controlled by control system 51b via signal lines. In particular, the relative position of the diffraction gratings 65, 67 in the x-y plane is adjustable by controlling the actuators 68, 68'. Further, the actuators may be controlled to rotate the diffraction gratings 65, 67 relative to each other. Thereby, an optical property of the variable light shaping member, in particular a focal length and an astigmatism, can be adjusted as desired.

Each diffraction grating comprises a substrate and a plurality of optical diffraction structures arranged thereon. The optical diffraction structures 69 influence in particular a phase and/or an amplitude of the measuring light traversing the variable light shaping member 29b.

An arrangement and optical properties of the optical diffraction structures 69 may be described by a so-called phase-function $f(x,y)$ being a function of the coordinates x, y spanning the area of both diffraction gratings 65, 67. The phase-function of both diffraction gratings is given by $$f(x, y) = a\left(\frac{x^3}{3} + x \cdot y^2\right),$$

where a represents an arbitrary constant.

The phase-function $f(x,y)$ is symmetric with respect to the coordinate y and is anti-symmetric with respect to the coordinate x.

The two diffraction gratings 65 and 67 successively arranged are not in the same orientation but one of the diffraction gratings is rotated by 180° around the y-axis. The total phase-function of the variable light shaping member 29b is $$g(x,y,\Delta x,\Delta y,\Delta\phi)=f(x,y)-f(x-\Delta x,y-\Delta y,\phi-\Delta\phi).$$

Herein $\Delta x$, $\Delta y$, $\Delta\phi$ denote a translational shift in the x-direction, a translational shift in the y-direction, and a rotation around the z-axis, of the two diffraction gratings 65 an 67 relative to each other, respectively. A corresponding rotation around an angle $\Delta\phi$ around the z-axis is illustrated in FIG. 4B. A translational shift of amount $\Delta x$ in the x-direction is illustrated in FIG. 4C, a translational shift of amount $\Delta y$ in the y-direction is illustrated in FIG. 4D, and a translational shift of amount $\Delta z$ along the z-direction is illustrated in FIG. 4E. Depending on the kind and amount of relative displacement of the two diffraction gratings 65 and 67 having the above-mentioned phase-function implemented different total phase-functions realized by the successive arrangement of the two diffraction gratings 65 and 67 result. In particular, depending on the kind and amount of relative displacement of the two diffraction gratings, optical properties in the area of extension of the variable light shaping member 29b can be modified in a desired way.

Figure 5A:
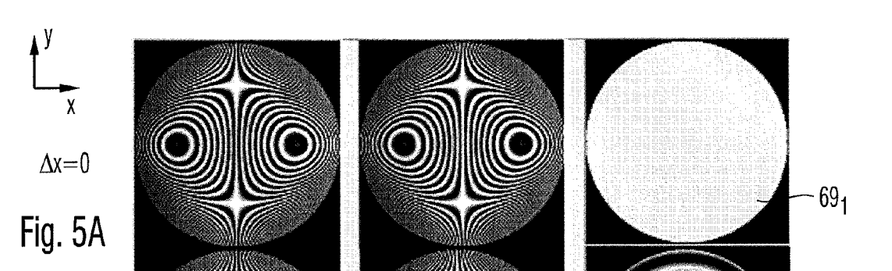
FIG. 5A, FIG. 5B, FIG. 5C, FIG. 5D, FIG. 5E schematically illustrate relative displacements in an x-direction of the two diffraction gratings comprised in the variable light forming member illustrated in FIGS. 4A to 4E and also the resulting modification of the optical properties of the variable light forming member.

As an example of an effect of a displacement of the two diffraction gratings 65 and 67 relative to each other, FIGS. 5A, 5B, 5C, 5D and 5E illustrate an effect of displacing the two diffraction gratings 65 and 67 relative to each other in the x-direction. In FIGS. 5A to 5E the x-direction corresponds to the horizontal direction. Although in fact successively arranged in the direction orthogonal to the drawing plane, the diffraction gratings 65 and 67 are depicted in FIGS. 4A to 4E side by side (diffraction grating 65 shown at the left hand side, diffraction grating 67 shown in the middle) and the total phase-function is shown on the right hand side in each of the FIGS. 4A to 4E. FIG. 5A illustrates the case, wherein a relative displacement of the two diffraction gratings 65, 67 in the x-direction is zero. Due to the anti-symmetric property of the phase-function $f(x,y)$ with respect to the x-coordinate and the different orientations of the two diffraction gratings (one is rotated 180° around the y-axis) the two differently oriented phase-functions cancel resulting in a constant total phase-function $69_1$.

Figure 5B:
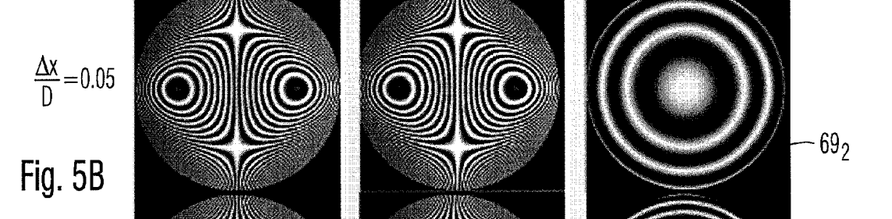
Figure 5C:
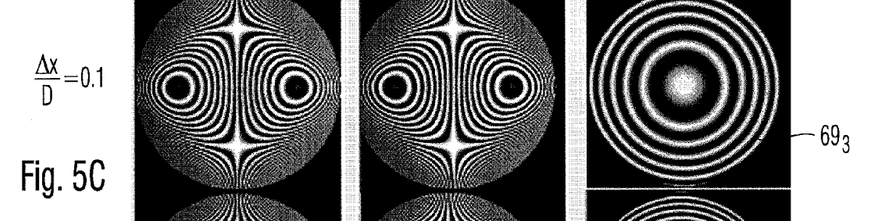
Figure 5D:
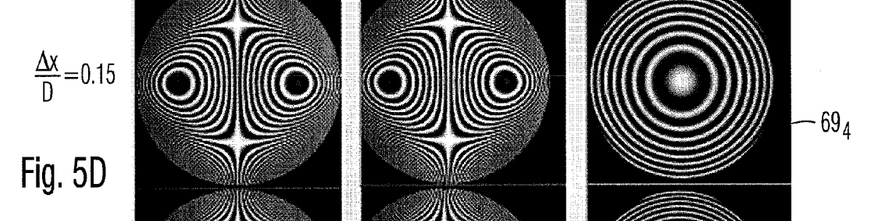
Figure 5E:
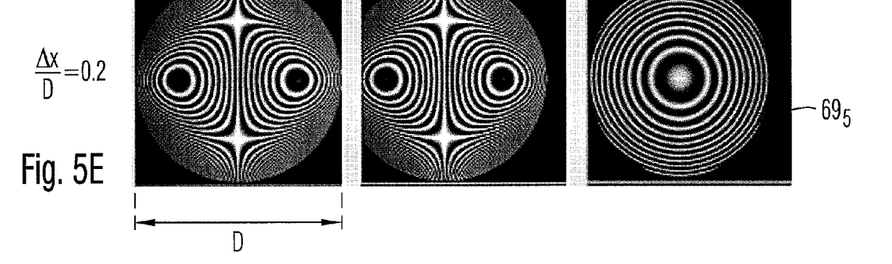

FIG. 5B illustrates the case of a displacement $\Delta x=0.05D$ of the two diffraction gratings 65 and 67 relative to each other in the x-direction. In this case, the total phase-function $69_2$ exhibits a variance across the area of the variable light shaping member 29b showing concentric rings. These concentric rings have a converging effect on measuring light traversing the variable light shaping member 29b. FIGS. 5C, 5D and 5E illustrate relative displacements of the diffraction gratings 65 and 67 along the x-direction of even higher amounts. It is obvious, the higher the relative displacement of the two diffraction gratings 65 and 67 in the x-direction, the more concentric rings evolve in the resulting total phase-function $69_3$, $69_4$, $69_5$, respectively. This in turn indicates that the variable light shaping member exhibits a higher and higher converging effect on measuring light traversing the same. In other words, a focal length of the variable light shaping member 29b decreases with increasing amount of relative displacement of the two diffraction gratings 65 and 67 in the x-direction.

Figure 6A:
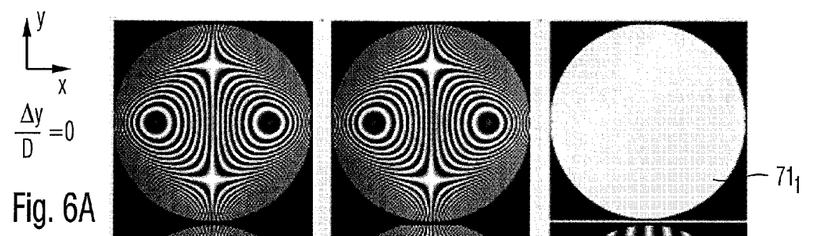
FIG. 6A, FIG. 6B, FIG. 6C, FIG. 6D, FIG. 6E schematically illustrate displacements of the two diffraction gratings comprised in the variable light shaping member illustrated in FIGS. 4A to 4E along a y-direction and also the resulting modification of the optical properties of the variable light shaping member.
Figure 6B:
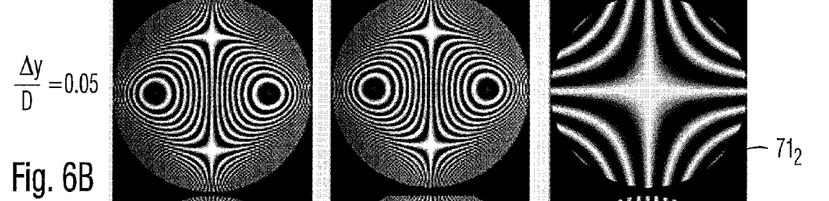
Figure 6C:
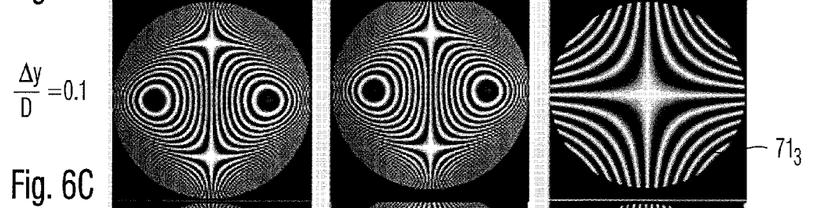
Figure 6D:
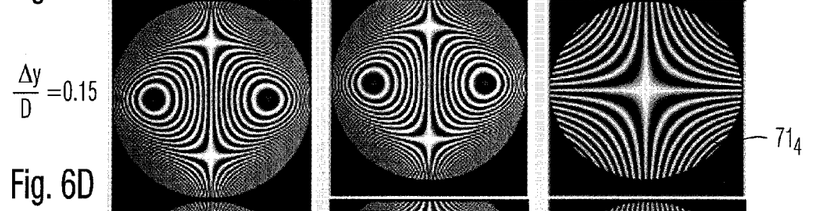
Figure 6E:
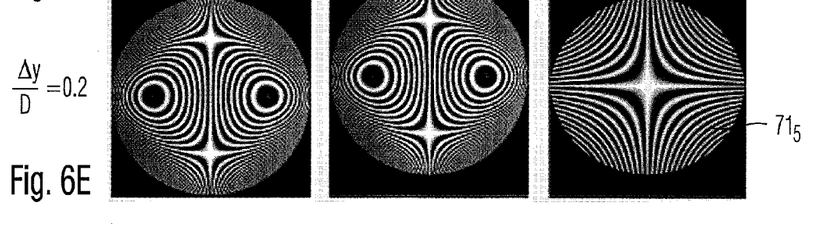

FIGS. 6A, 6B, 6C, 6D and 6E illustrate the effect of a relative displacement of the two diffraction gratings 65 and 67 along the y-direction. Again, although in fact successively arranged in a direction perpendicular to the drawing plane, the two diffraction gratings 65 and 67 are depicted side by side (diffraction grating 65 at the left hand side and diffraction grating 67 in the middle) and the resulting total phase-function is illustrated on the right hand side in each of the FIGS. 6A to 6E. Again, as shown in FIG. 6A the total phase-function $71_1$ shows no contrast and thus no effect on traversing measuring light, when the relative displacement of the two diffraction gratings 65 and 67 is zero. In FIG. 6B the case is illustrated, where the relative displacement of the two diffraction gratings 65 and 67 is $\Delta y=0.05D$. The resulting total phase-function $71_2$ resembling a shape of a saddle. The result on measuring light traversing the variable light shaping member 29b exhibiting the total phase-function $71_2$ is that rays of the measuring light propagating in perpendicular planes will be focused to different points. Thus, the total phase-function $71_2$ has an effect of an astigmatic lens, such as a cylinder lens. The magnitude of the astigmatism can be increased by increasing the amount of relative displacement of the two diffraction gratings 65 and 67 along the y-direction, as illustrated in FIGS. 6C, 6D and 6E. The principal axis of the astigmatism can be adjusted by rotating the two diffraction gratings 65 and 67.

Figure 7:
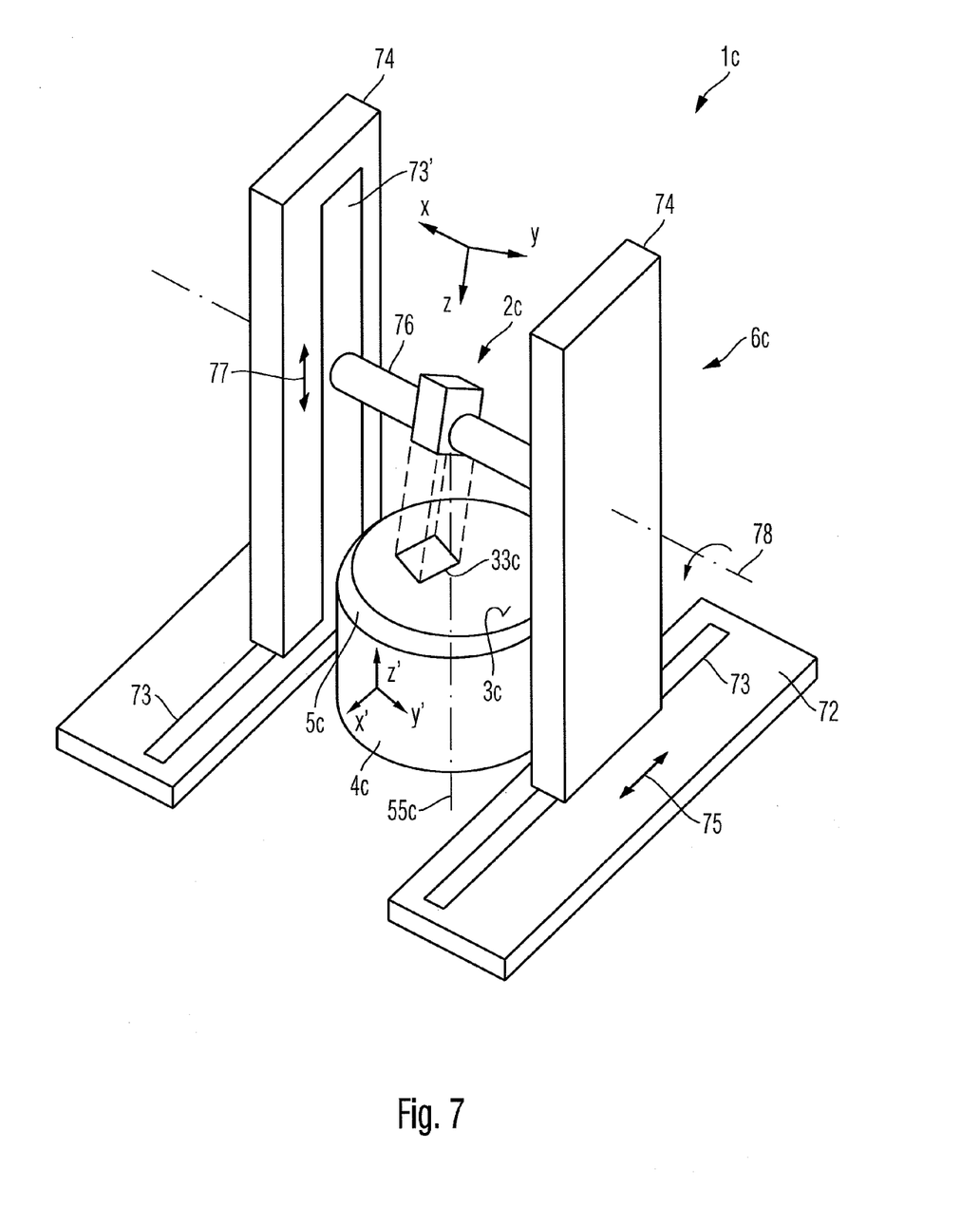
FIG. 7 schematically illustrates another embodiment of a system for measuring a surface of an object which comprises a three-axis positioning apparatus.

FIG. 7 illustrates another embodiment 1c of a system for measuring a surface of an object. The system 1c comprises an interferometer 2c, an object holder 4c and a three-axis positioning apparatus 6c. The interferometer 2c may be configured as interferometers 2 or 2a illustrated in FIGS. 1 and 3, respectively. The three-axis positioning apparatus 6c is provided to displace the interferometer 2c relative to the object 5c mounted at the object holder 4c. The three-axis positioning apparatus 6c comprises two base plates 72 comprising horizontal guide tracks 73. In the horizontal guide tracks two vertical bars 74 are slidable in a direction indicated by double arrow 75. The vertical bars 74 in turn comprise each a vertical guide track 73' in which a shaft 76 is slidable in directions indicated by double arrow 77. The shaft 76 is rotatable around an axis 78. At the shaft 76 the interferometer 2c is mounted such that it is appropriately positioned to measure a portion 33c of the surface 3c of the object 5c mounted at the object holder 4c. By shifting the interferometer 2c in directions indicated by double arrows 75 and 77 and rotating the interferometer 2c around the axis 78 other portions of the surface 3c of the object 5c can be measured to obtain surface shape data representing a shape of the surface 3c of the object 5c. For this, also the object holder 4c is rotatable around an axis 55c, similar as the object holders 4 and 4a illustrated in FIGS. 1 and 3, respectively.

Summarized, embodiments of the present invention comprise methods and systems for measuring a surface of an object, wherein portions of the surface of the object are interferometrically measured and data representing a shape of the surface of the object are obtained by stitching the measurement data corresponding to each portion together. For measuring the individual portions of the surface of the object a variable light shaping member is utilized preferably constructed by successively arranging two diffraction gratings in a beam path of measuring light and appropriately displacing the two diffraction gratings relative to each other depending on a target shape of a particular portion of the surface of the object.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A method of measuring a surface of an object, the method comprising:
   illuminating a first portion of the surface of the object with a first portion of measuring light;
   detecting light emanating from the first portion of the surface, the light being superimposed with a second portion of the measuring light by interference;
   modifying at least one optical property of a variable light shaping member;
   displacing the surface of the object, to illuminate a second portion of the surface of the object with the first portion of the measuring light; and
   detecting light emanating from the second portion of the surface, the light being superimposed with the second portion of the measuring light by interference,
   wherein one of the following holds:
   the first portion of the measuring light has traversed the variable light shaping member before illuminating the surface of the object; and
   the second portion of the measuring light has traversed the variable light shaping member before being detected and superimposed with the first portion of the measuring light emanating from the surface of the object, and
   wherein the variable light shaping member comprises two diffraction gratings arranged in a beam path of the measuring light and wherein said modifying of the at least one optical property of the variable light shaping member comprises displacing the two diffraction gratings relative to each other.

2. The method according to claim 1, wherein said displacing of the two diffraction gratings relative to each other comprises at least one of rotating and translating one of the diffraction gratings relative to the other of the diffraction gratings.

3. The method according to claim 1, wherein both diffraction gratings comprise a substrate in which substantially a same phase function is implemented.

4. The method according to claim 1, wherein the first portion and the second portion of the surface of the object each comprise less than 80% of a total surface area of the object.

5. The method according to claim 1, wherein said detecting of the light emanating from at least one of the first portion and the second portion of the surface comprises acquiring images using a spatially resolving detector.

6. The method according to claim 1, further comprising:
   evaluating an intensity of the detected light having emanated from at least one of the first portion and the second portion of the surface of the object, to obtain measuring data representing a surface shape of the surface.

7. The method according to claim 1, wherein substantially an entire surface of the object is measured by repeated application of said illuminating and said detecting to different portions of the surface and repeated application of said modifying of the at least one optical property.

8. A method of manufacturing an optical element, the method comprising:
   obtaining measuring data representing a surface shape of the optical element according to the method as claimed in claim 6;
   processing the optical element based on the measuring data representing the surface shape of the optical element comprising at least one of planing, grinding, etching, polishing, processing using a particle beam, and applying a protective coating.

* * * * *

UNITED STATES PATENT AND TRADEMARK OFFICE
CERTIFICATE OF CORRECTION

| | | |
|---|---|---|
| PATENT NO. | : 8,243,281 B2 | Page 1 of 1 |
| APPLICATION NO. | : 12/238193 | |
| DATED | : August 14, 2012 | |
| INVENTOR(S) | : Bernd Doerband | |

It is certified that error appears in the above-identified patent and that said Letters Patent is hereby corrected as shown below:

Page 2, column 1, line 11: delete "mutliple" and insert -- multiple --

Page 2, column 1, line 12: delete "surace" and insert -- surface --

Page 2, column 1, line 17: delete "Industria" and insert -- Industrial --

Column 1, Line 67: delete "It" and insert -- it --

Column 2, Line 32: delete the second occurrence of "at least" and insert -- at at least --

Column 2, Line 64: delete "at least" and insert -- at at least --

Column 3, Line 29: delete "at least" and insert -- at at least --

Column 3, Line 64: delete "at least" and insert -- at at least --

Column 7, Lines 65-67: delete "FIG. 2B illustrate..............in FIG. 1;" and insert the same on Col. 7, Line 64, after "FIG. 2A," as a continuation of the same line.

Column 10, Line 14: delete "at least" and insert -- at at least --

Column 13, Line 39: delete "65 an 67" and insert -- 65 and 67 --

Signed and Sealed this
Eighth Day of January, 2013

David J. Kappos
*Director of the United States Patent and Trademark Office*